(12) United States Patent
Cluet et al.

(10) Patent No.: US 12,240,196 B2
(45) Date of Patent: Mar. 4, 2025

(54) METHOD FOR MANUFACTURING A VEHICLE SEAT ELEMENT

(71) Applicant: FAURECIA Sièges d'Automobile, Nanterre (FR)

(72) Inventors: Mathieu Cluet, Etampes (FR); Benoît Gazaniol, Arpajon (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 18/374,778

(22) Filed: Sep. 29, 2023

(65) Prior Publication Data

US 2024/0109266 A1 Apr. 4, 2024

(30) Foreign Application Priority Data

Sep. 30, 2022 (FR) ...................................... 2209960

(51) Int. Cl.
| | |
|---|---|
| *B29C 48/00* | (2019.01) |
| *B29C 48/05* | (2019.01) |
| *B29C 48/265* | (2019.01) |
| *B29C 48/88* | (2019.01) |
| *B29D 99/00* | (2010.01) |
| *B60N 2/68* | (2006.01) |
| *B29K 23/00* | (2006.01) |
| *B29K 67/00* | (2006.01) |
| *B29K 77/00* | (2006.01) |
| *B29L 31/00* | (2006.01) |
| *B29L 31/58* | (2006.01) |

(52) U.S. Cl.
CPC ...... *B29D 99/0092* (2013.01); *B29C 48/0021* (2019.02); *B29C 48/05* (2019.02); *B29C 48/265* (2019.02); *B29C 48/911* (2019.02); *B60N 2/682* (2013.01); *B29K 2023/06* (2013.01); *B29K 2023/12* (2013.01); *B29K 2067/00* (2013.01); *B29K 2077/00* (2013.01); *B29L 2031/58* (2013.01); *B29L 2031/771* (2013.01)

(58) Field of Classification Search
CPC . B29C 48/911; B29C 48/0021; B29C 48/265; B29C 48/05; B29C 48/919; B29C 48/345; B29C 48/0012; B29D 99/0092; B60N 2/682; B60N 2/72; B60N 2/7017; B60N 2/7094; B60N 2/70; B29K 2077/00; B29K 2023/06; B29K 2023/12; B29K 2067/00; B29L 2031/58; B29L 2031/771
See application file for complete search history.

(56) References Cited

U.S. PATENT DOCUMENTS

| 5,564,144 A * | 10/1996 | Weingartner ............ B60N 2/70 |
| | | 297/452.53 |
| 9,409,332 B2 * | 8/2016 | Kröner ................ B29C 45/1418 |
| 2024/0066764 A1 * | 2/2024 | Cluet ...................... B32B 5/022 |

FOREIGN PATENT DOCUMENTS

| DE | 102010006668 A1 * | 8/2011 | ........... B60N 2/5664 |
| DE | 102013207917 A1 * | 11/2014 | ........... B60N 2/7094 |

OTHER PUBLICATIONS

French Search Report for Counterpart French App. No. FR2209960 dated May 5, 2023, 18 pages, (English Translation Included).

* cited by examiner

*Primary Examiner* — Ryan J. Walters
(74) *Attorney, Agent, or Firm* — Barnes & Thornburg LLP (57) ABSTRACT

A method for manufacturing a vehicle seat element comprising the following steps: a. providing an armature of the seat element, b. providing a net and a frame, at least one portion of the net being surrounded by the frame and fastened to the frame, c. fastening the frame and/or the net to the armature, d. providing a padding comprising a 3D tangling of continuous thermoplastic fibers arranged irregularly forming loops welded together, and e. fastening the padding onto the net and/or onto the frame.

15 Claims, 6 Drawing Sheets

METHOD FOR MANUFACTURING A VEHICLE SEAT ELEMENT

PRIORITY CLAIM

This application claims priority to French Patent Application No. FR2209960, filed Sep. 30, 2022, which is expressly incorporated by reference herein.

BACKGROUND

The present disclosure relates to a method for manufacturing a vehicle seat element as well as a seat element obtained by such a method.

SUMMARY

According to the present disclosure, a method for manufacturing a vehicle seat element comprises the following steps: a) providing an armature of the seat element, b) providing a net and a frame, at least one portion of the net being surrounded by the frame and fastened to the frame, c) fastening the frame and/or the net to the armature, d) providing a padding comprising a 3D entanglement of continuous thermoplastic fibers arranged irregularly forming loops welded together, and e) fastening the padding onto the net and/or onto the frame.

In illustrative embodiments, the padding is made of a material other than polyurethane foam. This padding material is advantageously a recyclable plastics material and its production generates less $CO_2$ emissions than the production of a polyurethane foam. In addition, the method using this material for the padding can make it possible to create a padding substantially lighter than a similar padding made of polyurethane foam. In addition, the padding material may be more breathable, allowing air and any moisture to pass through the padding better.

In illustrative embodiments, the method makes it possible to implement a light net instead of a metal suspension sheet, which is advantageous in terms of the mass of the seat and also as regards the cost, which is lower than comparative elements.

The flexibility of the entire net and padding makes it possible to achieve comfort for the user.

Mounting and removing the seat element is easy.

The features disclosed in the following paragraphs may optionally be implemented independently of one another or in combination with one another.

Step e includes fastening the padding, in particular directly, onto the net using a bonding method selected from the group consisting of adhesive bonding, flame treatment, high-frequency welding, heat-activated bonding, or mechanical fastening, in particular using fastening elements fitted to the net and/or the frame.

Bonding includes, for example, of spraying an adhesive, in particular a neoprene adhesive or a polyester-based adhesive, using a specific gun on the net, in particular on the face of the net intended to receive the padding, and/or on the padding, in particular on the face of the padding intended to be fastened to the net.

Flame treatment is a method aimed at burning a first material on the surface with a flame (at a temperature above 800° C.) to melt it, and then to apply a second material thereto. During the application of the second material, the temperature at the surface of the first material does not exceed 50° C. In this case, it involves melting, by heating with a flame, the surface of the padding (constituting the first material) and then applying the net (constituting the second material) on top, while the temperature at the surface of the padding does not exceed 50° C.

High-frequency welding is preferably implemented at a frequency between 25 and 40 MHz, for example equal to 27.12 MHz.

Heat-activated bonding includes, in particular, in using an adhesive that is heat-activated. It is thus a matter of depositing a layer of such an adhesive onto the net, in particular on the face of the net intended to receive the padding, and/or on the padding, in particular on the face of the padding intended to be fastened to the net, and then to heat the adhesive before applying the net and the padding against each other.

When a mechanical fastening is implemented, at least one fastening element comprising a textile strip fastened to the padding can be used, in particular at the edge thereof, the textile strip comprising a free end fastened to a hook, preferably made of plastics material, suitable for fastening to the frame.

Alternatively, the net comprises at least one slot and the fastening element comprises a strip of textile, in particular elastic, fastened to the padding, in particular in an inner portion at a distance from the edge of the padding, the textile strip comprising a free end on which a bar is fastened able to be inserted into the slot of the net and to come to bear on a face of the net opposite the face of the net in contact with the padding, so as to allow the padding to be held against the net.

In another embodiment, the fastening element comprises a zipper, a first part of which is fastened to the net, in particular to a periphery thereof, and a second part is fastened to the padding, in particular to a periphery thereof, so that the first and the second part can cooperate to connect the net and the padding.

The padding advantageously covers an entire face of the net. Alternatively, it covers only a part thereof. The padding is preferably fastened to the face of the net so as to substantially match the shape.

The padding can be cut before being fastened to the net. Such a cutting can be carried out by any suitable method, in particular by laser or water jet cutting, using a cutting press or other technique and equipment.

The cutting includes, for example, of forming a flat padding, the opposite main faces of the padding extending in two parallel planes. The cutting can be carried out additionally or alternatively so that the padding has an external contour matching the shape of the frame after cutting, in particular a contour similar to that of the frame, so as to make the contours of the padding and the frame coincide.

The frame may be made of plastics material or metal. The frame can be formed of tubes or rods or other uprights. The net is advantageously fastened by pinching and/or snap-fastening to the frame, preferably in a tensioned state of the net. The tension is carried out for example by an elongation of the material by 5 to 15% of its length at rest. The net is preferably relatively taut on the frame so as to offer resistance and flexibility for the user.

The net may be made of a thermoplastic polymer material chosen in particular from the group consisting of polyamide, polyester, polypropylene and polyethylene, in a perforated form. The net has an elasticity that makes it possible in particular to achieve a deformation of 20% without having permanent deformation.

The frame is fastened to the armature by means of fastening elements, selected in particular from the group consisting of clips and positioning straps. Different types of fastening elements can be used for fastening a frame to an armature, for example both clips and positioning straps can be used for fastening a frame to the armature.

Step d advantageously comprises the following sub-steps:
i. extruding a material comprising at least one thermoplastic polymer into an extrusion die comprising a plurality of extrusion nozzles, to form a curtain of molten fibers,
ii. forming an entanglement of molten fibers, the fibers forming loops welded together,
iii. solidifying the entanglement of fibers by cooling using a liquid or gas, in particular in a bath of cooling liquid, so as to obtain the padding.

Step iii may comprise immersing the entanglement of fibers in a bath of cooling liquid, in particular in a water bath, the initial temperature of the liquid preferably being between 8° C. and 10° C.

A step of cutting the entanglement of fibers can also be provided, in particular when the quantity of fibers is sufficient to create the padding.

Preferably, the voids between the fibers of the 3D entanglement of fibers of the padding are left free.

The extrusion die used in sub-step i may comprise, along the lengthwise direction of the extrusion die, a plurality of separate areas comprising different surface densities of nozzles, comprising at least one first area with a low surface density of nozzles, and at least one second area with a high surface density of nozzles in such a way as to obtain at least a first area having a low bulk density and at least a second area having a high bulk density, along the direction of the 3D entanglement of fibers extending along the longitudinal direction of the extrusion die.

According to one embodiment, which may optionally be combined with the preceding one, the extrusion die comprises, along the widthwise dimension of the extrusion die, a first section provided with first extrusion nozzles for generating hollow fibers, and a second section provided with second extrusion nozzles for the generating solid fibers.

According to one embodiment, the temperature of the extrusion implemented in sub-step i in the extrusion die is between 180° C. and 240° C.

The thermoplastic fibers of the padding may be hollow fibers and/or solid fibers, with a diameter of between 0.2 mm and 2 mm, preferentially between 0.3 mm and 1.5 mm. The composition of the fibers preferably comprises at least 95% PET by weight. The thermoplastic material constituting the fibers can be recycled.

The sub-step ii may comprise guiding the curtain of molten fibers between two counter-rotating guide members by forming a clotting of fibers upstream of the two guide members, so as to form the entanglement of molten fibers forming loops welded together.

The method may comprise the step of covering the padding of a cap, the cap constituting the finishing element of the seat visible to a user, this step being able to be implemented after the step of fastening the padding to the net.

The positioning of the cap and/or the means for fastening the cap on the padding can allow the padding and the net to be held together. In this case, no other fastening means or bonding method is necessarily used to secure the padding and the net.

The cap is for example made of woven, nonwoven, leather, artificial leather or leather.

The order of the steps of the method can be modified without departing from the scope of the present disclosure.

In particular, the steps can be carried out in the order indicated from a to e. Alternatively, step c takes place after step e. In this case, the fastening onto the armature takes place after the assembly of the net and frame with the padding.

According to another aspect, a vehicle seat element obtained by the method as defined above in all combinations thereof is proposed.

The vehicle seat element may comprise of at least one of:
a backrest,
a squab;
an armrest;
a headrest;
an upper backrest adjustment device; and
a device for adjusting the length of the squab.

The vehicle seat element may in particular be a seat comprising a backrest and a squab. The number of armatures, nets, frames, and padding is not limiting. In particular, there may be an armature, a net and a frame as well as a padding for each of the backrest and the squab and optional other seat element. In one variant, there is a single net and frame and a single padding to make the entire backrest and squab. In another variant, there are several nets, frames and/or paddings for each of the seat elements.

According to one embodiment, the thickness of the padding, when the seat element is a backrest, may be comprised between 30 mm and 60 mm and/or the thickness of the padding when the seat element is a squab may be between 40 mm and 120 mm.

According to one embodiment, the padding layer, when the seat element is a backrest, can comprise different areas having different bulk densities, distributed along the longitudinal direction of the padding layer, when the seat element is a backrest and/or the padding layer, when the seat element is a squab, can comprise different areas having different bulk densities, along the longitudinal direction of the layer of the padding.

The 3D entanglement of the padding for example has a bulk density between 45 kg/m$^3$ and 65 kg/m$^3$.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the various figures, the same references designate identical or similar elements. For simplicity's sake, only the elements that are useful for understanding the described embodiment are shown in the figures and are described in detail below.

In the following description, when referring to terms qualifying absolute position, such as the terms "front", "rear", "top", "bottom", "left", "right", etc., or relative ones, such as the terms "above", "below", "upper", "lower", etc., or to qualifiers of orientation, such as "horizontal", "vertical", etc., reference is made, unless otherwise specified, to the orientation of the figures or a vehicle seat in its normal position of use.

Figure 1:
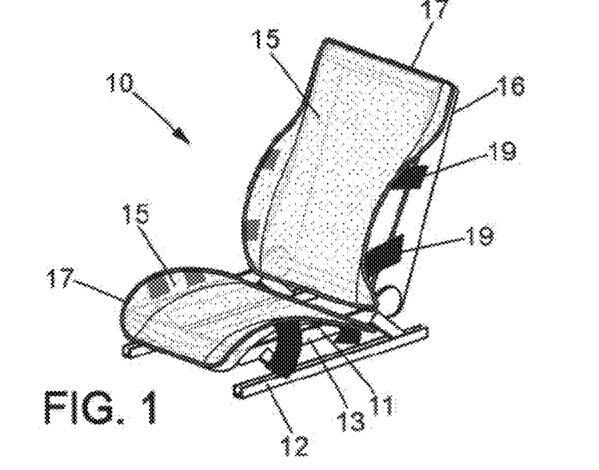
FIG. 1 schematically shows a perspective view of an example vehicle seat comprising an armature and a net, without a seat trim.
Figure 2:
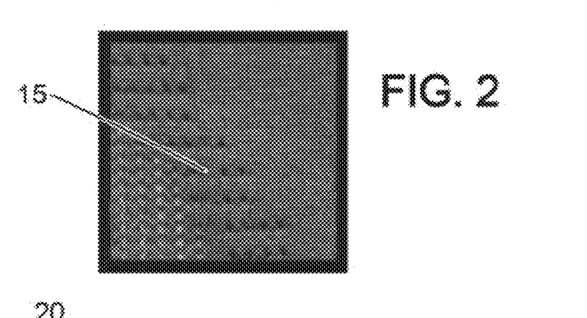
FIG. 2 shows in an isolated and partial manner an example of a net material used in the seat of FIG. 1.
Figure 3:
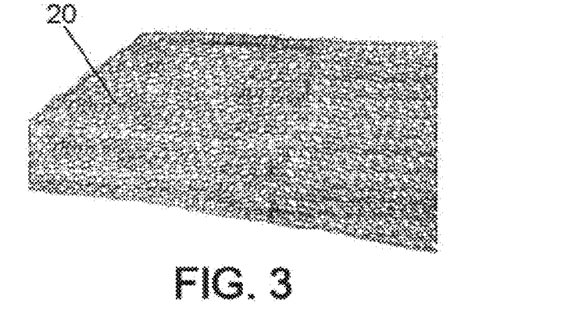
FIG. 3 shows in isolation and in perspective an example padding to be associated with the vehicle seat of FIG. 1 in the method according to one embodiment.

Reference is now made to FIGS. 1 to 3. According to the present disclosure, the method described with reference to FIGS. 1 to 3 comprises the step comprising providing an armature 11 of a motor vehicle seat element. In this example, the seat element is a backrest and a seat. It is not outside the scope of the present disclosure if the seat element comprises an armrest and/or a headrest in particular. FIG. 1 schematically shows a part of a motor vehicle seat 10 while being manufactured, mounted on a slide mechanism 12. This seat 10 comprises a metal armature 11, so as to form a squab armature 13 and a backrest armature 16.

The method comprises the step comprising providing a net 15 and a frame 17. At least part of the net 15, in this example the entire net 15, is surrounded by the frame 17 and fastened to the frame 17. The frame 17 can be made of plastics material or metal, in this example made of plastics material. In this example, the net 15 is fastened by pinching to the frame 17, in a tensioned state of the net, as visible. The tension is carried out for example by an elongation of the material by 5 to 15% of its length at rest. The net 15 is thus relatively taut on the frame 17 so as to offer resistance and flexibility for the user. It is not outside the scope of the present disclosure if the net 15 is fastened by snap-fastening to the frame 17.

The net 15, a portion of which is shown in FIG. 2, is made of a thermoplastic polymer material, in this example polyamide, in a perforated form. The net has an elasticity chosen to allow the flexibility and resistance suitable for use. In this example, the elasticity is such that it makes it possible to achieve a deformation of 20% without having permanent deformation.

The method comprises the step comprising fastening the frame 17 and/or the net 15 to the armature 11. In this example, it is the frame 17 that is fastened to the armature 11, using fastening elements 19. In this example, a net 15 and a frame 17 are provided to be fastened to the backrest armature 16 and another net 15 and frame 17 are provided to be fastened to the squab armature 13.

In this example, the fastening elements 19 are clips or positioning straps. Different types of fastening elements 19 can be used for fastening a frame 17 to an armature 13 or 16, for example both clips and positioning straps can be used for fastening a frame 17 to the armature 13 or 16.

The method further comprises the step of providing a padding 20 as shown in FIG. 3, comprising a 3D entanglement of continuous thermoplastic fibers arranged irregularly forming loops welded together.

Figure 4:
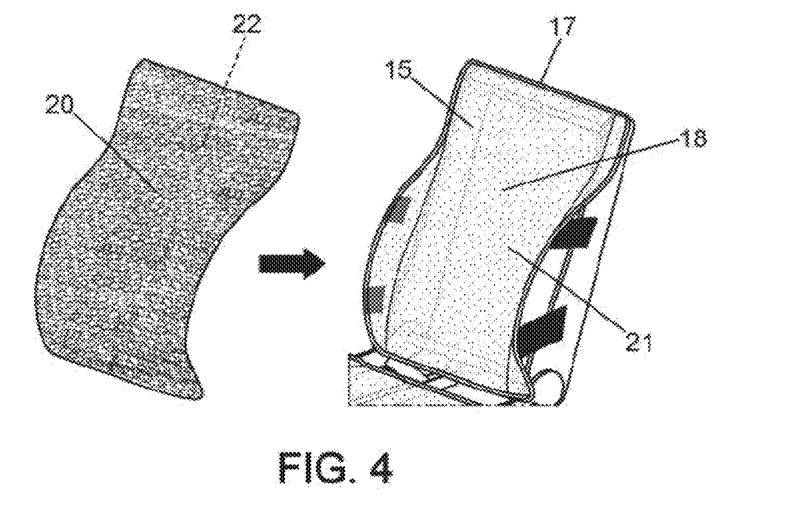
FIG. 4 schematically shows an example implementation of the method according to the present disclosure.

The method finally comprises a step comprising fastening the padding 20 on the net 15 and/or on the frame 17. This step can be carried out as illustrated in FIG. 4.

In this example, this fastening step comprising fastening the padding 20 directly to the net 15 using a bonding method comprising adhesive bonding. The bonding comprise spraying an adhesive 18, in this example a neoprene adhesive, using a specific gun on the net 15, more specifically on the face 21 of the net intended to receive the padding 20. In one variant or additionally, the adhesive 18 is deposited on the padding 20, in particular on the face 22 of the padding intended to be fastened to the net 15.

The method comprises, in this example, the step comprising cutting the padding 20 before being fastened to the net. Such a cutting may be carried out by any suitable method, in particular by laser or water jet cutting, using a cutting press or other suitable technique and equipment. The cutting comprises, for example, of forming a flat padding blank, as shown in FIG. 3, the opposite main faces of this padding blank extending in two parallel planes. The cutting can be carried out so that the obtained padding 20 has an external contour matching the shape of the frame 17 after cutting, in particular a contour similar to that of the frame 17, as in the example shown in FIG. 4, so as to make the contours of the padding 20 and the frame 17 coincide once the padding 20 is placed.

Still in this example, the padding 20 is provided to cover the entire face 21 of the net. In this example, the padding 20 is fastened directly to this face 21 of the net so as to substantially match the shape. In the example shown, the padding 20 is shown already in its shape even though it is not yet arranged on the net 15. However, it is in contact with the net 15 during its fastening that the padding 20 takes its final shape, being deformed using the connection.

Other bonding methods for fastening the padding 20 onto the net 15 can be envisaged.

In one embodiment, the method of connection implemented is a flame treatment, high-frequency welding or heat-activated bonding. The flame treatment comprises burning the padding 20 at the surface of the face 22 with a flame (at a temperature greater than 800° C.) to melt it, and then to apply the net 15 thereto, in particular the face 21. During the application of the net 15, the temperature at the surface of the padding 20 does not exceed 50° C.

Another bonding method used to secure the padding 20 onto the net comprises high-frequency welding, implemented in an example at a frequency equal to 27.12 MHz.

Another bonding method may be heat-activated bonding. Heat-activated bonding comprises using an adhesive that is heat-activated. It is thus a matter of depositing a layer of such an adhesive onto the net 15, in particular on the face 21 of the net intended to receive the padding, and/or on the padding 20, in particular on the face 22 of the padding intended to be fastened to the net 15, and then to heat the adhesive before applying the net 15 and the padding 20 against each other.

Alternatively, the fastening of the padding 20 to the net 15 can be mechanical using fastening elements fitted to the net 15 and/or to the frame 17. An example of mechanical fastening of the padding 20 to the net 15 was shown in FIG. 5.

Figure 5:
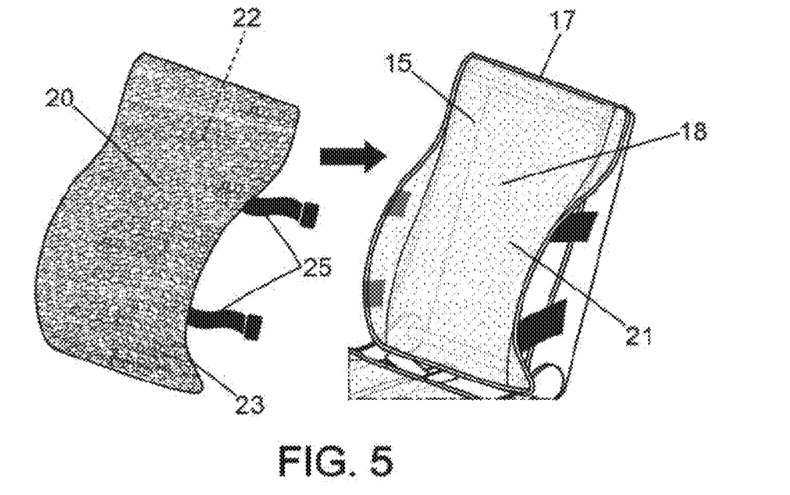
FIG. 5 schematically shows another example implementation of the method according to the present disclosure.
Figure 6:
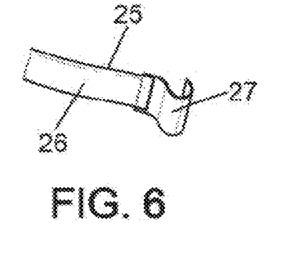
FIG. 6 shows in isolation and schematically an example of a fastening system that can be used in the embodiment of FIG. 5.
Figure 7:
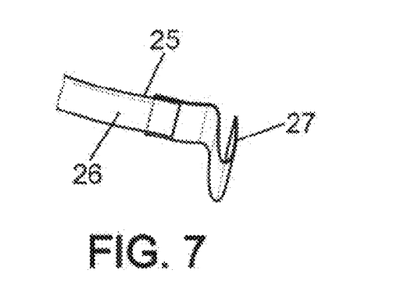
FIG. 7 shows in isolation and schematically another example of a fastening system that can be used in the embodiment of FIG. 5.

In this example, at least one, in particular several fastening elements 25, two of which are visible in FIG. 5, are used and which can be as illustrated in FIG. 6 and/or in FIG. 7. In each of the examples of FIGS. 6 and 7, the fastening element 25 comprises a textile strip 26 fastened to the padding 20, in particular to an edge 23 thereof, the textile strip 26 comprising a free end fastened to a hook 27, preferably made of plastics material, suitable for engaging with the frame 17. The fastening elements 25 of FIGS. 6 and 7 differ in the shape of the hook 27.

Figure 8:
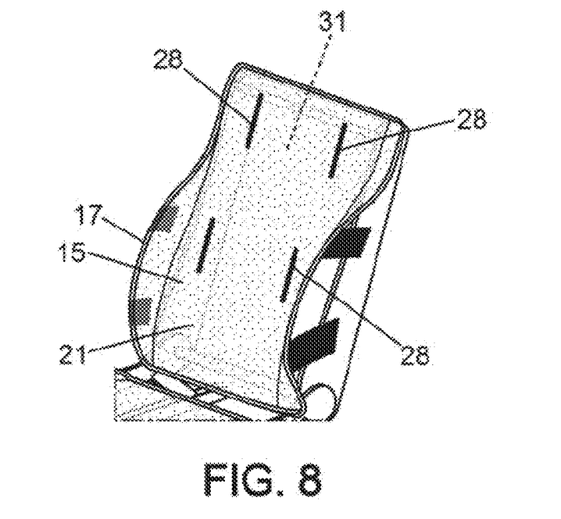
FIG. 8 schematically shows an example of a seat element provided with a net to be associated with a padding according to the method of the present disclosure.
Figure 9:
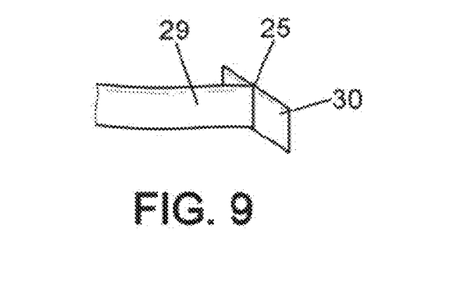
FIG. 9 shows in isolation and schematically an example of a fastening system that can be used to fasten a padding to the net shown in FIG. 8.

To fasten the padding 20 to the net 15 using a mechanical fastener, another example is shown in FIGS. 8 and 9. In this example, the net 15 comprises at least one slot 28, in this example four slots 28. The fastening element 25 shown in FIG. 9 comprises a strip of textile 29, in particular elastic, fastened to the padding 20, in particular in an inner portion at a distance from the edge of the padding 20 on the face 22, the textile strip 29 comprising a free end on which a bar 30 is fastened able to be inserted into the slot 28 of the net 15 and to come to bear on a face 31 of the net opposite the face 21 of the net in contact with the padding 20, so as to allow the padding 20 to be held against the net 15.

The method may comprise the step of covering the padding 20 of a cap 32, the cap 32 constituting the finishing element of the seat visible to a user, this step being able to be implemented after the step of fastening the padding 20 to the net 15.

Figure 10:
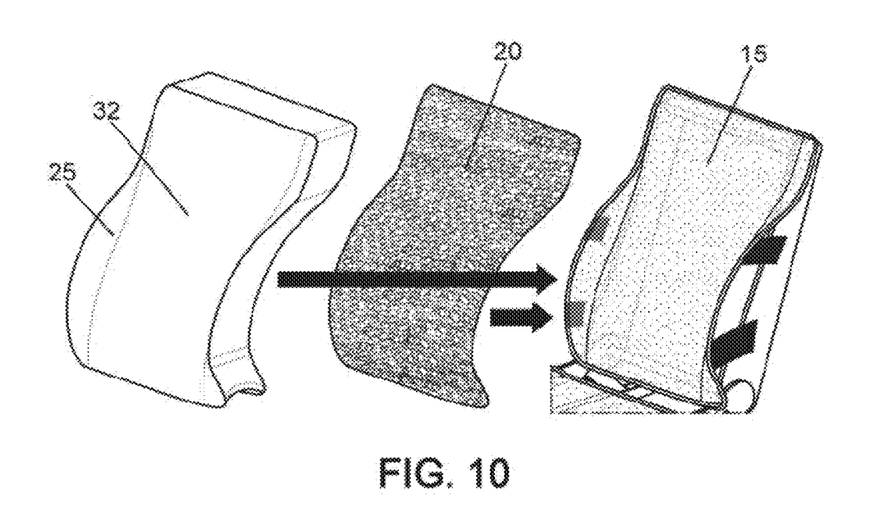
FIG. 10 schematically shows another example implementation of the method according to the present disclosure.

In the example shown in FIG. 10, the positioning of the cap 32, optionally associated with means for fastening the cover 32 to the padding 20, can allow the padding 20 and the net 15 to be held together. It is the cap 32, here, which constitutes the fastening element 25. In this example, no other fastening means or bonding method is necessarily used to secure the padding 20 and the net 15 to one another.

Figure 11:
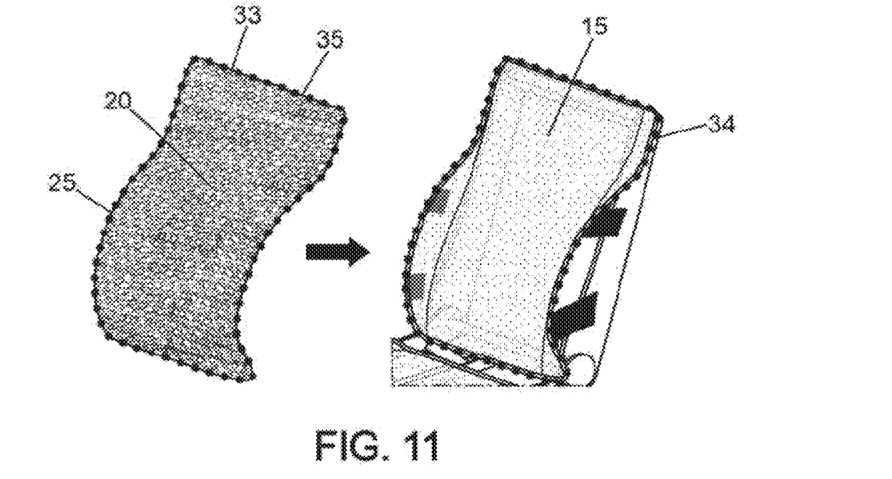
FIG. 11 schematically shows another example implementation of the method according to the present disclosure.

In another embodiment shown in FIG. 11, the fastening element 25 comprises a zipper 33, a first part 34 of which is fastened to the net 15, in particular to a periphery thereof, and a second part 35 is fastened to the padding, in particular to a periphery thereof, so that the first and second parts 34 and 35 can cooperate to connect the net 15 and the padding 20.

Figure 12:
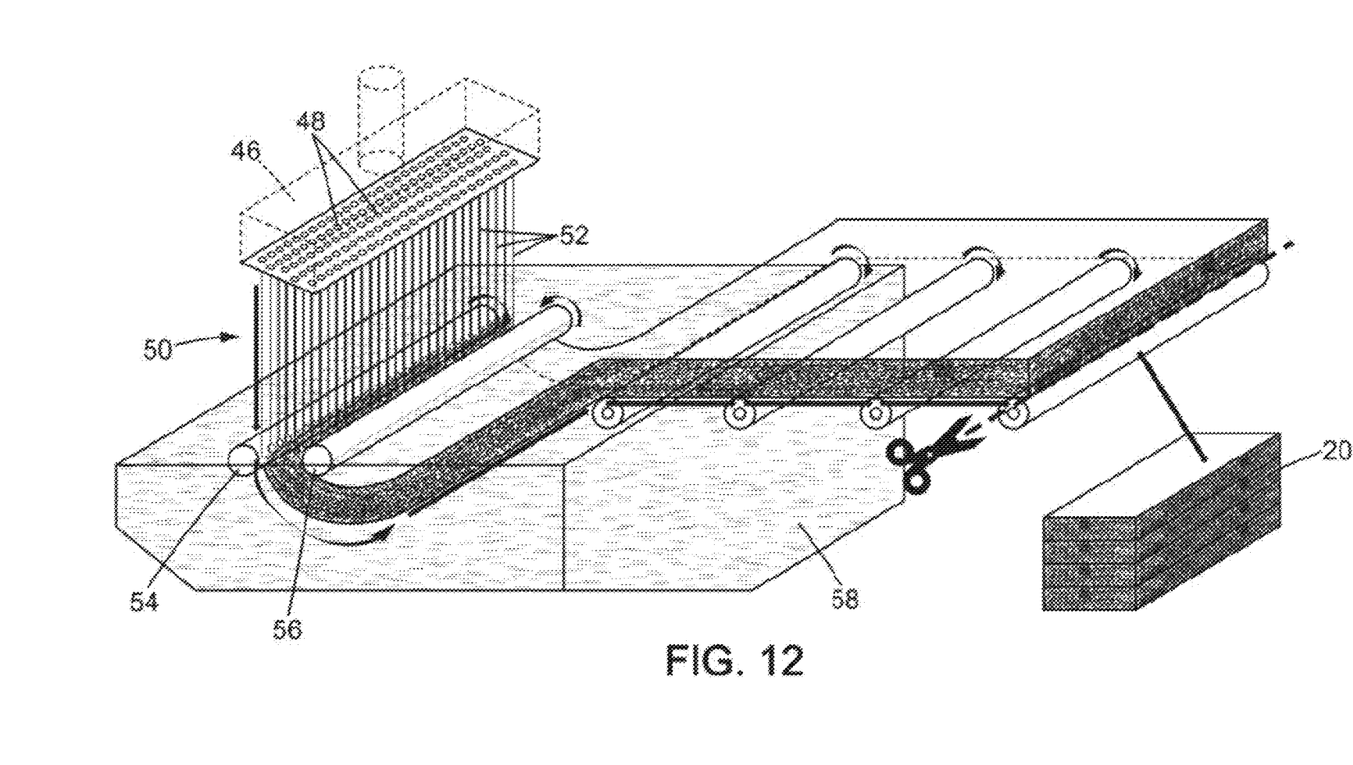
FIG. 12 schematically shows an example method for producing a padding.

FIG. 12 shows an installation making it possible to obtain the padding 20 and to view the method for providing the padding 20 visible in isolation in FIG. 3.

According to the example shown in FIG. 12, the method, here continuous, comprises a first step comprising extruding a plastics material containing at least one thermoplastic polymer, in an extrusion die 46 comprising a plurality of extrusion nozzles 48.

To do this, the extrusion die 46 can be supplied with granules of polymer(s). The extrusion die 46 may for example be suitable for heating the plastics material, in particular the polymer(s), to a temperature between 180° C. and 240° C.

According to the example shown, the extrusion nozzles 48 are regularly distributed in two perpendicular directions to form an extrusion nozzle matrix 48. The extrusion die 46 thus makes it possible to form a curtain 50 of continuous molten fibers 52, the fiber density 52 of which is substantially constant in cross-section (that is to say in a plane perpendicular to the forward direction of the extruded fibers 52). Here, the extrusion nozzles 48 are distributed in a horizontal plane. Also, to preserve the density of the fibers 52 substantially constant in cross-section of the curtain 50 of fibers 52, the fibers 52 are here gravity-driven at the outlet of the extrusion die 46.

Here "curtain 50 of fibers 52" is understood to mean a configuration of the fibers 52 extending substantially parallel to one another, the fibers 52 being comprised, in a plane perpendicular to their forward direction, in an envelope curve corresponding substantially to the section of the extrusion die 46, here substantially rectangular. Alternatively, it is possible to speak of a rain of fibers 52 from the outlet of the extrusion nozzles 48.

In a second step of the method for producing the padding 20 still visible in FIG. 12, the molten fibers 52 are driven toward two counter-rotating guide members 54, 56. Here, the guide members 54, 56 are identical rollers, in particular of the same, constant diameter. Preferably, the minimum distance between the two rollers 54, 56 is less than the smallest dimension (or width) of the cross-section of the fiber 52 curtain 50, while the other dimension of the cross-section of the curtain 50 of fibers 52, the largest (or length), is substantially equal to or less than the length of the rollers 54, 56.

Preferably, at the outlet of the extrusion die 46 and upstream of the rollers 54, 56, the temperature of the plastics material of which the fibers 52 are formed is between 180° C. and 240° C.

Preferably, the two rollers 54, 56 rotate at the same speed. The speed of the two rollers 54, 56 is chosen so as to create a clotting of molten fibers 52, upstream of the two rollers 54, 56. This may in particular be achieved by choosing a speed of the rollers 54, 56 such that the product of the area of the smallest surface between the two rollers 54, 56 multiplied by the rotational speed of the rollers 54, 56 is less than the surface flow rate of the extrusion die 46. According to one particular example, this can in particular be obtained by choosing a speed of rotation of the rollers 54, 56, less than the speed of the curtain 50 of fibers 52 upstream of the two rollers 54, 56. Thus, an accumulation of molten fibers 52 is formed upstream of the rollers 54, 56. The fibers 52 then tend to form continuous loops, which, due to the temperature of the fibers 52, become bound together. In particular, the fibers 52 can fuse together. It is thus possible to obtain an entanglement of molten fibers 52, which is then guided between the rollers 54, 56 to have a substantially rectangular cross-section. In particular, the thickness of the entanglement of fibers 52 may be defined by the distance between the two rollers 54, 56, the thickness of the entanglement of fibers 52 being in particular substantially equal to the distance between the two rollers 54, 56. The fibers 52 can be distributed irregularly in the entanglement of fibers 52, in particular according to a distribution that can appear random to an observer.

It is noted here that the rollers 54, 56 deliver the entanglement of fibers 52 in a substantially continuous manner. In other words, the volume of fibers 52 passing through the area between the two rollers 54, 56 is substantially constant per unit of time. In other words, the entanglement of fibers 52 is continuous at the outlet of the rollers 54, 56.

In a third step of the method for producing the padding 20, the fibers 52 are solidified. To do this, the entanglement of fibers 52 can be guided in a cooling bath 58, for example a bath of cooling liquid such as water, at a temperature for example of 8° C. to 10° C., after having passed through the passage between the two rollers 54, 56. For example, the two rollers 54, 56 are submerged at mid-height, as shown in FIG. 12.

In a fourth step of the method visible in FIG. 12, the entanglement of fibers 52 is guided, outside the cooling bath 58, in particular to be dried. The drying can be carried out by shaking/vibrations of the entanglement of fibers 52. The entanglement of fibers 52 can then be shaped to form the padding 20. The entanglement of fibers 52 may in particular be cut. As shown in FIG. 12, several paddings 20 each formed of several fiber 52 entanglement layers are stacked while waiting for their use.

The method that has just been described with reference to FIG. 12 makes it possible to obtain a substantially homogeneous padding 20, having similar fibers 52 and a homogeneous bulk density, within substantially the entire volume of the padding 20.

The installation may also comprise a control of the opening and closing of the extrusion nozzles 48. It is thus possible to open or close at least some of the extrusion nozzles 48 of the extrusion die 46 during the extrusion process. The opening and closing of the extrusion nozzles 48 can be controlled by an electronic control unit, in particular a computer.

The thermoplastic fibers of the padding in this example are hollow fibers and/or solid fibers, with a diameter of between 0.3 mm and 1.5 mm. The composition of the fibers comprises at least 95% PET by weight. The 3D entanglement of the padding 20 in this example has a bulk density between 45 kg/m3 and 65 kg/m3.

Figure 13:
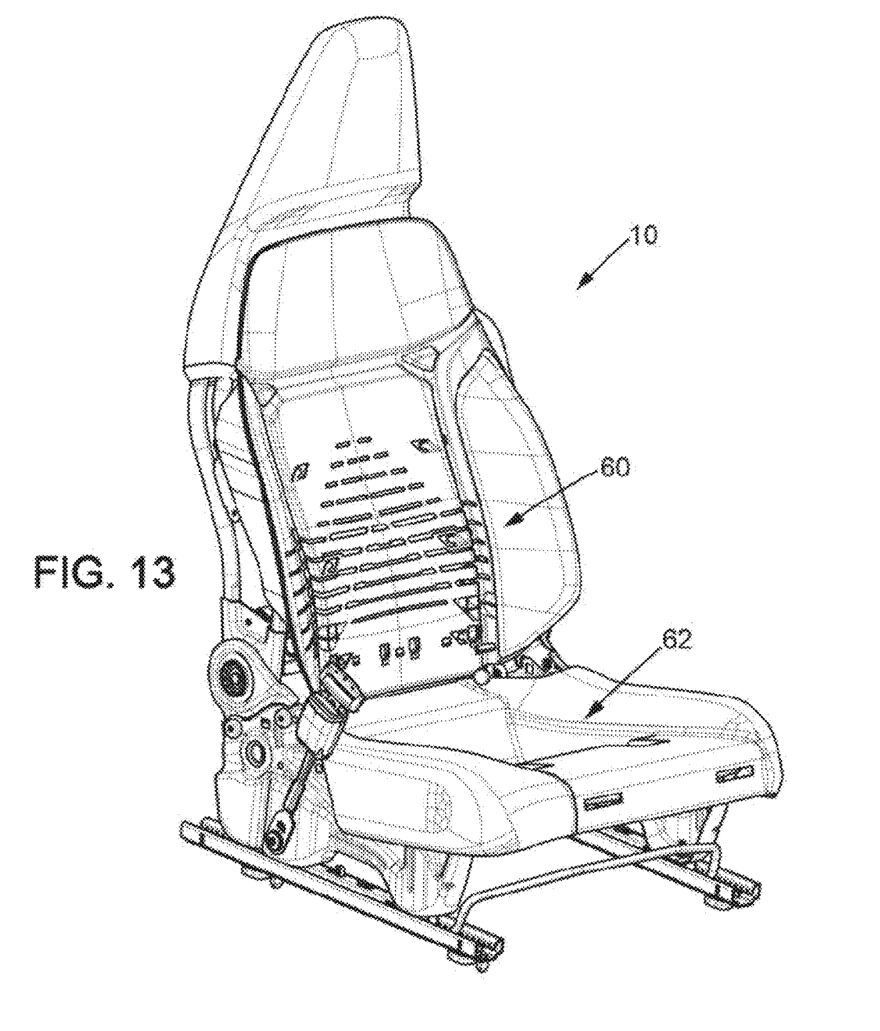
FIG. 13 is a schematic perspective view of an example of a motor vehicle seat obtained using the method according to the present disclosure.

By virtue of the method according to the present disclosure, it is possible to obtain a vehicle seat element 10, as shown in FIG. 13, of which a backrest 60 comprising an armature 16, a net 15 and a frame 17 as well as a padding 20 produced as described above as well as a squab 62 comprising an armature 16, a net 15 and a frame 17 as well as a padding 20 made in a similar way to that described above, the method then of course fitting the shape of the seat 62 forming the seat element.

The present disclosure is not limited to the examples that have just been described.

In one embodiment, the padding covers only part of the net.

The order of the steps of the method can be modified without departing from the scope of the present disclosure. In one embodiment, the fastening on the armature 13 or 16 may take place after the assembly of the net 15 and frame 17 with the padding 20.

Comparative padding of the seat elements of vehicles, in particular motor vehicles, is made of foam of urethane (or polyurethane, PU) polymer, in particular of polyurethane foam obtained from polyols of the polyether/polyol (or PUR) type. Such foams can be shaped in molds in a relatively easy manner, to form various shapes of padding for different vehicle seat elements, such as the squab or backrest, for example.

The foam paddings are satisfactory, but can retain moisture, in particular in humid conditions. This may induce a sensation of discomfort for an occupant of the vehicle seat, an element of which comprises such padding.

Furthermore, a polyurethane foam may be carried out by mixing, inter alia, polyols with isocyanates. The chemical reaction used emits $CO_2$ to form a foam, the $CO_2$ emitted contributing to global warming.

Furthermore, a polyurethane foam is not recyclable.

Thus, it appears desirable to limit the use of polyurethane in the padding of the vehicle seat elements.

Furthermore, there is a need to lighten the mass of a vehicle seat.

The present disclosure improves the situation.

A method is proposed for manufacturing a vehicle seat element comprising the following steps:
  a. providing an armature of the seat element,
  b. providing a net and a frame, at least one portion of the net being surrounded by the frame and fastened to the frame,
  c. fastening the frame and/or the net to the armature,
  d. providing a padding comprising a 3D entanglement of continuous thermoplastic fibers arranged irregularly forming loops welded together,
  e. fastening the padding onto the net and/or onto the frame.

Thus, the padding is made of a material other than the polyurethane foam. This padding material is advantageously a recyclable plastics material and its production generates less $CO_2$ emissions than the production of a polyurethane foam. In addition, the method using this material for the padding can make it possible to create a padding substantially lighter than a similar padding made of polyurethane foam. In addition, the padding material may be more breathable, allowing air and any moisture to pass through the padding better.

In addition, the method makes it possible to implement a light net instead of a metal suspension sheet, which is advantageous in terms of the mass of the seat and also as regards the cost, which is lower than in the comparative metal suspension sheets.

The flexibility of the entire net and padding makes it possible to achieve comfort for the user.

Mounting and removing the seat element is easy.

The features disclosed in the following paragraphs may optionally be implemented independently of one another or in combination with one another.

Step e preferably comprises fastening the padding, in particular directly, onto the net using a bonding method selected from the group comprising adhesive bonding, flame treatment, high-frequency welding, heat-activated bonding, or mechanical fastening, in particular using fastening elements fitted to the net and/or the frame.

Bonding comprises, for example, spraying an adhesive, in particular a neoprene adhesive or a polyester-based adhesive, using a specific gun on the net, in particular on the face of the net intended to receive the padding, and/or on the padding, in particular on the face of the padding intended to be fastened to the net.

Flame treatment is a method aimed at burning a first material on the surface with a flame (at a temperature above 800° C.) to melt it, and then to apply a second material thereto. During the application of the second material, the temperature at the surface of the first material does not exceed 50° C. In this case, it involves melting, by heating with a flame, the surface of the padding (constituting the first material) and then applying the net (constituting the second material) on top, while the temperature at the surface of the padding does not exceed 50° C.

High-frequency welding is preferably implemented at a frequency between 25 and 40 MHz, for example equal to 27.12 MHz.

Heat-activated bonding comprises, in particular, in using an adhesive that is heat-activated. It is thus a matter of depositing a layer of such an adhesive onto the net, in particular on the face of the net intended to receive the padding, and/or on the padding, in particular on the face of the padding intended to be fastened to the net, and then to heat the adhesive before applying the net and the padding against each other.

When a mechanical fastening is implemented, at least one fastening element comprising a textile strip fastened to the padding can be used, in particular at the edge thereof, the textile strip comprising a free end fastened to a hook, preferably made of plastics material, suitable for fastening to the frame.

Alternatively, the net comprises at least one slot and the fastening element comprises a strip of textile, in particular elastic, fastened to the padding, in particular in an inner portion at a distance from the edge of the padding, the textile strip comprising a free end on which a bar is fastened able to be inserted into the slot of the net and to come to bear on a face of the net opposite the face of the net in contact with the padding, so as to allow the padding to be held against the net.

In another embodiment, the fastening element comprises a zipper, a first part of which is fastened to the net, in particular to a periphery thereof, and a second part is fastened to the padding, in particular to a periphery thereof, so that the first and the second part can cooperate to connect the net and the padding.

The padding advantageously covers an entire face of the net. Alternatively, it covers only a part thereof. The padding is preferably fastened to the face of the net so as to substantially match the shape.

The padding can be cut before being fastened to the net. Such a cutting can be carried out by any suitable method, in particular by laser or water jet cutting, using a cutting press or other technique and equipment.

The cutting comprises, for example, forming a flat padding, the opposite main faces of the padding extending in two parallel planes. The cutting can be carried out additionally or alternatively so that the padding has an external contour matching the shape of the frame after cutting, in particular a contour similar to that of the frame, so as to make the contours of the padding and the frame coincide.

The frame may be made of plastics material or metal. The frame can be formed of tubes or rods or other uprights. The net is advantageously fastened by pinching and/or snap-fastening to the frame, preferably in a tensioned state of the net. The tension is carried out for example by an elongation of the material by 5 to 15% of its length at rest. The net is preferably relatively taut on the frame so as to offer resistance and flexibility for the user.

The net may be made of a thermoplastic polymer material chosen in particular from the group consisting of polyamide, polyester, polypropylene and polyethylene, in a perforated form. The net has an elasticity that makes it possible in particular to achieve a deformation of 20% without having permanent deformation.

The frame is fastened to the armature by means of fastening elements, selected in particular from the group consisting of clips and positioning straps. Different types of fastening elements can be used for fastening a frame to an armature, for example both clips and positioning straps can be used for fastening a frame to the armature.

Step d advantageously comprises the following sub-steps:
  i. extruding a material comprising at least one thermoplastic polymer into an extrusion die comprising a plurality of extrusion nozzles, to form a curtain of molten fibers,
  ii. forming an entanglement of molten fibers, the fibers forming loops welded together,
  iii. solidifying the entanglement of fibers by cooling using a liquid or gas, in particular in a bath of cooling liquid, so as to obtain the padding.

Step iii may comprise immersing the entanglement of fibers in a bath of cooling liquid, in particular in a water bath, the initial temperature of the liquid preferably being between 8° C. and 10° C.

A step of cutting the entanglement of fibers can also be provided, in particular when the quantity of fibers is sufficient to create the padding.

Preferably, the voids between the fibers of the 3D entanglement of fibers of the padding are left free.

The extrusion die used in sub-step i may comprise, along the lengthwise direction of the extrusion die, a plurality of separate areas comprising different surface densities of nozzles, comprising at least one first area with a low surface density of nozzles, and at least one second area with a high surface density of nozzles in such a way as to obtain at least a first area having a low bulk density and at least a second area having a high bulk density, along the direction of the 3D entanglement of fibers extending along the longitudinal direction of the extrusion die.

According to one embodiment, which may optionally be combined with the preceding one, the extrusion die comprises, along the widthwise dimension of the extrusion die, a first section provided with first extrusion nozzles for generating hollow fibers, and a second section provided with second extrusion nozzles for the generating solid fibers.

According to one embodiment, the temperature of the extrusion implemented in sub-step i in the extrusion die is between 180° C. and 240° C.

The thermoplastic fibers of the padding may be hollow fibers and/or solid fibers, with a diameter of between 0.2 mm and 2 mm, preferentially between 0.3 mm and 1.5 mm. The composition of the fibers preferably comprises at least 95% PET by weight. The thermoplastic material constituting the fibers can be recycled.

The sub-step ii may comprise in guiding the curtain of molten fibers between two counter-rotating guide members by forming a clotting of fibers upstream of the two guide members, so as to form the entanglement of molten fibers forming loops welded together.

The method may comprise the step of covering the padding of a cap, the cap constituting the finishing element of the seat visible to a user, this step being able to be implemented after the step of fastening the padding to the net.

The positioning of the cap and/or the means for fastening the cap on the padding can allow the padding and the net to be held together. In this case, no other fastening means or bonding method is necessarily used to secure the padding and the net.

The cap is for example made of woven, nonwoven, leather, artificial leather or leather.

The order of the steps of the method can be modified without departing from the scope of the present disclosure. In particular, the steps can be carried out in the order indicated from a to e. Alternatively, step c takes place after step e. In this case, the fastening onto the armature takes place after the assembly of the net and frame with the padding.

According to another aspect, a vehicle seat element obtained by the method as defined above in all combinations thereof is proposed.

The vehicle seat element may comprise of at least one of:
a backrest,
a squab;
an armrest;
a headrest;
an upper backrest adjustment device; and
a device for adjusting the length of the squab.

The vehicle seat element may in particular be a seat comprising a backrest and a squab. The number of armatures, nets, frames, and padding is not limiting. In particular, there may be an armature, a net and a frame as well as a padding for each of the backrest and the squab and optional other seat element. In one variant, there is a single net and frame and a single padding to make the entire backrest and squab. In another variant, there are several nets, frames and/or paddings for each of the seat elements.

According to one embodiment, the thickness of the padding, when the seat element is a backrest, may be comprised between 30 mm and 60 mm and/or the thickness of the padding when the seat element is a squab may be between 40 mm and 120 mm.

According to one embodiment, the padding layer, when the seat element is a backrest, can comprise different areas having different bulk densities, distributed along the longitudinal direction of the padding layer, when the seat element is a backrest and/or the padding layer, when the seat element is a squab, can comprise different areas having different bulk densities, along the longitudinal direction of the layer of the padding.

The 3D entanglement of the padding for example has a bulk density between 45 kg/m$^3$ and 65 kg/m$^3$.

A method for manufacturing a vehicle seat element comprising the following steps:
   a. providing an armature (11, 13, 16) of the seat element,
   b. providing a net (15) and a frame (17), at least one portion of the net (15) being surrounded by the frame (17) and fastened to the frame (17),
   c. fastening the frame (17) and/or the net (15) to the armature (11, 13, 16),
   d. providing a padding (20) comprising a 3D tangling of continuous thermoplastic fibers (52) arranged irregularly forming loops welded together,
   e. fastening the padding (20) onto the net (15) and/or onto the frame (17).

The invention claimed is:

1. A method for manufacturing a vehicle seat element comprising the following steps:
   a. providing an armature of the seat element,
   b. providing a net and a frame, at least one portion of the net being surrounded by the frame and fastened to the frame,
   c. fastening the frame and/or the net to the armature,
   d. providing a padding comprising a 3D tangling of continuous thermoplastic fibers arranged irregularly forming loops welded together, and
   e. fastening the padding onto the net and/or onto the frame,
   wherein step e comprises fastening the padding to the net using a bonding method selected from the group consisting of adhesive bonding, flame treatment, high-frequency welding, heat-activated bonding, or mechanical fastening.

2. The method of claim 1, wherein the padding onto the net and/or onto the frame comprises using fastening elements fitted to at least one of the net and the frame.

3. The method of claim 1, wherein the padding covers the entire face of the net, and is fastened thereto so as to substantially match the shape.

4. The method of claim 1, wherein the padding is cut before being fastened to the net.

5. The method of claim 4, wherein the padding being cut comprises forming a flat padding, the opposite main faces of the padding extending in two parallel planes.

6. The method of claim 5, wherein the padding has an outer contour matching the shape of the frame after cutting.

7. The method of claim 1, wherein the frame is made of plastics material or metal.

8. The method of claim 7, wherein the net is fastened by at least one of pinching and snap-fastening to the frame.

9. The method of claim 8, wherein the net is fastened to the frame in a tensioned state of the net.

10. The method of claim 1, wherein the fastening of the frame to the armature is carried out by means of fastening elements.

11. The method of claim 10, wherein the fastening elements are chosen from the group consisting of clips and positioning straps.

12. The method of claim 1, wherein the net is made of a thermoplastic polymer material in a perforated form.

13. The method of claim 1, wherein step d comprises the following sub-steps:
   i. extruding a material comprising at least one thermoplastic polymer into an extrusion die comprising a plurality of extrusion nozzles, to form a curtain of molten fibers;
   ii. forming an entanglement of molten fibers, the fibers forming loops welded together,
   iii. solidifying the entanglement of fibers by cooling using a liquid or gas so as to obtain the padding.

14. The method of claim 1, wherein the net is taut on the frame.

15. A method for manufacturing a vehicle seat element comprising the following steps:
   a. providing an armature of the seat element,
   b. providing a net and a frame, at least one portion of the net being surrounded by the frame and fastened to the frame,
   c. fastening the frame and/or the net to the armature,
   d. providing a padding comprising a 3D tangling of continuous thermoplastic fibers arranged irregularly forming loops welded together, and
   e. fastening the padding onto the net and/or onto the frame,
   wherein the padding covers the entire face of the net, and is fastened thereto so as to substantially match the shape.

* * * * *